US009753698B2

(12) United States Patent
Gustafsson et al.

(10) Patent No.: US 9,753,698 B2
(45) Date of Patent: Sep. 5, 2017

(54) LANGUAGE-BASED MODEL FOR ISOLATING SHARED STATE

(75) Inventors: Niklas Gustafsson, Bellevue, WA (US);
Artur Laksberg, Redmond, WA (US);
Joshua Phillips, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1328 days.

(21) Appl. No.: 12/482,270

(22) Filed: Jun. 10, 2009

(65) Prior Publication Data

US 2010/0318975 A1   Dec. 16, 2010

(51) Int. Cl.
*G06F 9/45* (2006.01)
*G06F 9/44* (2006.01)
*G06F 9/445* (2006.01)
*G06F 9/50* (2006.01)

(52) U.S. Cl.
CPC .......... *G06F 8/314* (2013.01); *G06F 9/44563* (2013.01); *G06F 9/5077* (2013.01); *G06F 8/30* (2013.01)

(58) Field of Classification Search
CPC .......... G06F 8/314; G06F 9/5077; G06F 8/30; G06F 9/44563
USPC .................................. 717/136-137; 711/163
See application file for complete search history.

(56) References Cited

U.S. PATENT DOCUMENTS

| | | | |
|---|---|---|---|
| 6,167,423 A * | 12/2000 | Chopra et al. | 718/100 |
| 6,463,527 B1 | 10/2002 | Vishkin | |
| 6,557,168 B1 | 4/2003 | Czajkowski | |
| 6,567,974 B1 * | 5/2003 | Czajkowski | 717/151 |
| 6,754,776 B2 * | 6/2004 | Conway et al. | 711/129 |
| 6,851,114 B1 | 2/2005 | Czajkowski | |
| 7,451,434 B1 * | 11/2008 | Blumenthal et al. | 717/116 |

(Continued)

OTHER PUBLICATIONS

"Microsoft Corporation";"Axum programmer's guide";"May 8, 2009";"36 pages"; retreived from "http://download.microsoft.com/download/B/D/5/BD51FFB2-C777-43B0-AC24-BDE3C88E231F/Axum%20Programmers%20Guide.pdf".*
Daynes, et al."Lightweight Flexible Isolation for Language-Based Extensible Systems", Retrieved at<<http://www.cse.ust.hk/vldb2002/VLDB2002-proceedings/papers/S20P03.pdf>>, Proceedings of the 28th VLDB Conference, Hong Kong, China, 2002, pp. 12.

(Continued)

*Primary Examiner* — Wei Zhen
*Assistant Examiner* — Brahim Bourzik
(74) *Attorney, Agent, or Firm* — Dicke, Billig & Cjaza, PLLC

(57) ABSTRACT

A method and/or computer program that incorporates isolation principles of separate address spaces and enforces the principles with a compiler and supporting runtime through a language-based model is disclosed. This approach significantly lowers the required overhead and retains the beneficial qualities of the scalable, isolated model. The model is implemented in a programming language where memory-based state is partitioned into a plurality of domains where the variables inside of a domain are isolated from external components. Agents are introduced inside of the domain and act on behalf of clients outside of the domain. The agents communicate with their clients via message-passing to enforce the isolation of the domain state. The domain-based isolation addresses the partitioning of memory-based state without the introduction of separate processes. Domains can also be used in conjunction with a distributed model either within a single computing device or between computing devices.

16 Claims, 3 Drawing Sheets

(56) References Cited

U.S. PATENT DOCUMENTS

| | | | |
|---|---|---|---|
| 8,229,907 B2* | 7/2012 | Gray | G06F 17/30377 707/703 |
| 8,739,147 B2* | 5/2014 | Lebert | G06F 9/44563 717/162 |
| 2003/0097360 A1 | 5/2003 | McGuire et al. | |
| 2005/0071438 A1 | 3/2005 | Liao et al. | |
| 2006/0179429 A1 | 8/2006 | Eggers et al. | |
| 2009/0125882 A1* | 5/2009 | Frigo | G06F 8/314 717/116 |
| 2009/0307660 A1* | 12/2009 | Srinivasan | G06F 8/314 717/114 |
| 2011/0161604 A1* | 6/2011 | Laksberg | G06F 9/4881 711/153 |
| 2011/0161610 A1* | 6/2011 | Gustafsson | G06F 9/526 711/163 |
| 2011/0161962 A1* | 6/2011 | Laksberg | G06F 9/52 718/102 |
| 2011/0173595 A1* | 7/2011 | Gustafsson | G06F 8/433 717/146 |

OTHER PUBLICATIONS

"An Agent Programming Framework Based on the C# Language and the CLI", Retrieved at<<http://dotnet.zcu.cz/NET_2003/Papers/Grosso.pdf>>, Feb. 6-8, 2003, Pizen, Czech Republic , pp. 8.

Shpeisman, et al."Enforcing Isolation and Ordering in STM", Retrieved at<<https://www.cs.washington.edu/homes/djg/papers/tm_pldi07.pdf >>, PLDI'07 Jun. 11-13, 2007, San Diego, California, USA, pp. 11.

Botincan, et al., "Distributed Algorithms: A Case Study of the Java Memory Model", Retrieved at <<http://web.math.pmf.unizg.hr/~mabotinc/downloads/asm2007.pdf>>, Proceedings of the 14th International ASM Workshop (ASM 2007), 2007, 15 Pages.

Palatin, et al., "Capsule: Hardware-Assisted parallel execution of component-based programs", Retrieved at <<http://hal.archives-ouvertes.fr/docs/00/10/31/84/PDF/185_palatin_pierre.pdf>>, 39th Annual IEEE/ACM International Symposium on Microarchitecture (MICRO-39 2006), Dec. 9-13, 2006, 12 Pages.

* cited by examiner

LANGUAGE-BASED MODEL FOR ISOLATING SHARED STATE

BACKGROUND

Concurrent programming for shared-memory multiprocessors can include the ability for multiple threads to access the same data. The multiple threads execute on multiple processors, multiple processor cores, or other classes of parallelism that are attached to a memory shared between the processors. The shared-memory model is the most commonly deployed method of multithread communication. It allows multithreaded programs to be created in much the same way as sequential programming, which is a benefit because concurrent programming is itself notoriously difficult. Accessing memory without some form of coordination, however, risks introducing serious application errors such as race conditions and the like that often are difficult to track down and correct.

In order to implement the shared-memory model, concurrent programming uses care to avoid concurrent access and use of shared data that can create undesirable conditions. Many approaches to isolate shared state are directed to improving facilities for correct coordination of access to memory. These approaches can be very useful but often come at the expense of large-concurrent scalability. Another approach is to entirely forgo shared state between concurrent components and use only single-threaded access to memory such as through separate operating systems processes or address spaces for each concurrent component. This approach can require large amounts of overhead that can negate efficiencies gained from parallelization in an application.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to examples of a method or computer program that incorporates isolation principles of separate address spaces and enforces the principles with a compiler and supporting runtime through a language-based model. This approach significantly lowers the required overhead and retains the beneficial qualities of the scalable, isolated model. The model is implemented in a programming language where memory-based state is partitioned into a plurality of domains where the variables inside of a domain are isolated from the outside. Agents are introduced inside of the domain and act on behalf of clients outside of the domain. The agents communicate with their clients via message-passing to enforce the isolation of the domain state. The domain-based isolation addresses the partitioning of memory-based state without the introduction of separate processes. Domains can also be used in conjunction with a distributed model either within a single computing device or between computing devices.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
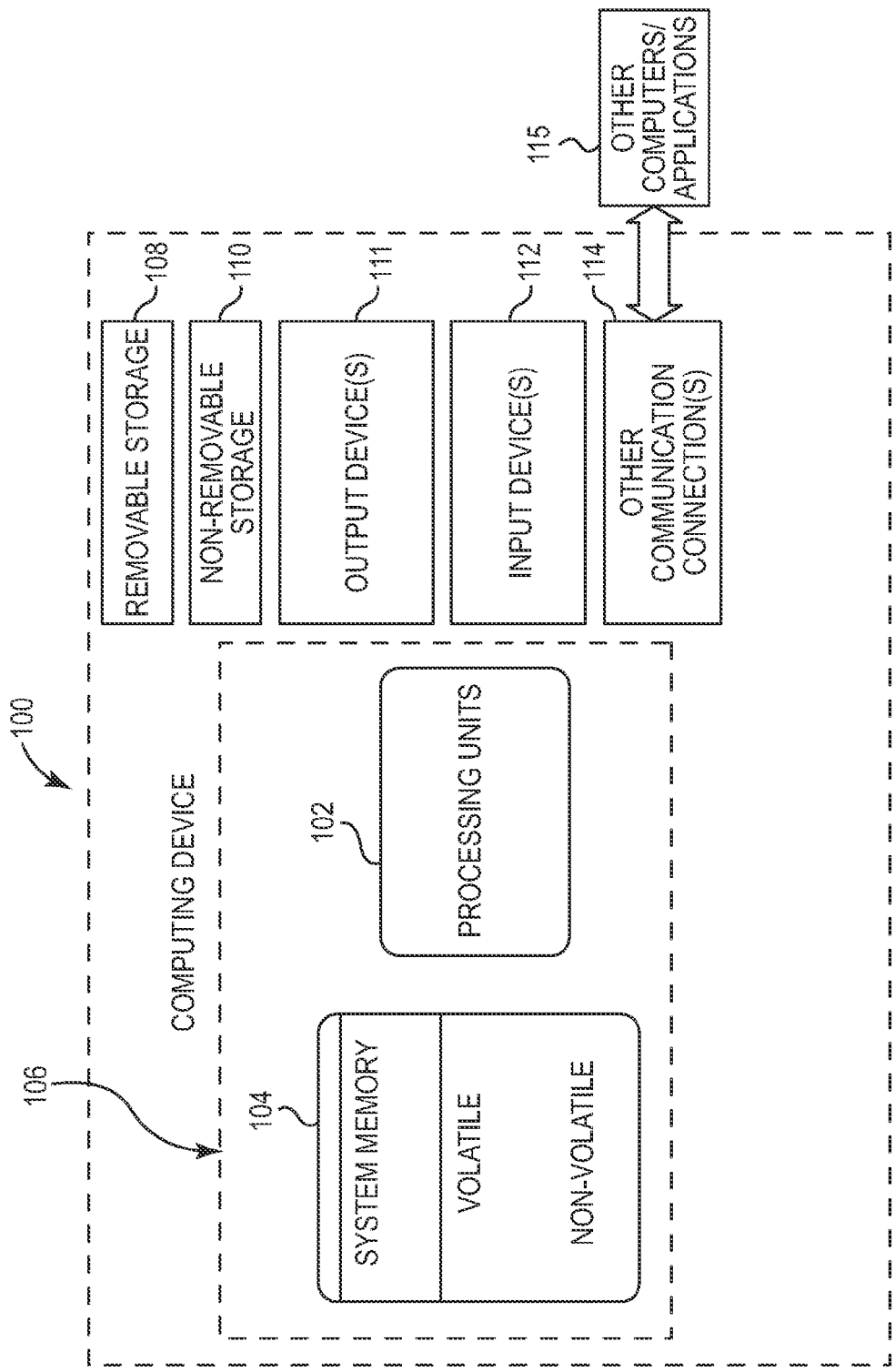
FIG. 1 is a block diagram illustrating an example computing system.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a personal computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. The managed environment typically includes a virtual machine that allows the software applications to run in the managed environment so that the developers need not consider the capabilities of the specific processors 102.

Figure 2:
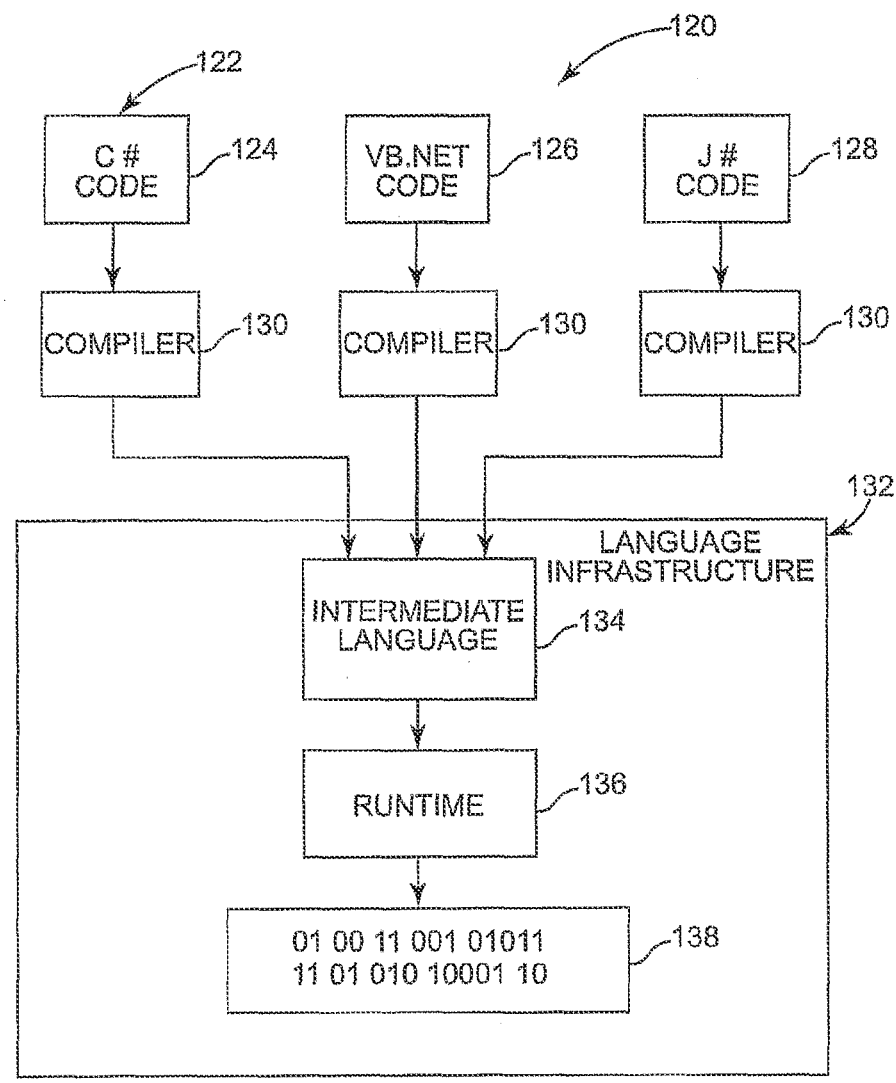
FIG. 2 is a block diagram illustrating one example of a managed environment operating on the computing system of FIG. 1.

FIG. 2 illustrates an example managed, or runtime, environment 120 suitable for operation with the computing device 100. Particular current examples of managed environment frameworks include .NET from Microsoft and Java from Sun Microsystems, Inc. of Santa Clara, Calif., United States, as well as others. The managed environment 120 is configured to accept programs written in a high-level compatible code of one or more programming languages 122. For example, the managed environment can accept programs written in programming languages such as C# (C-sharp) code 124, a visual basic type language such as VB.NET code 126, and/or a Java type language (such as J-sharp) 128. Compilers 130 are configured to compile each compatible code 124, 126, 128. The compiled code can be provided to an infrastructure 132 that describes an executable code and a runtime environment that describes a number of runtimes. An example infrastructure is Common Language Infrastructure (CLI). The infrastructure includes a second compiler 134 that receives the compatible languages and compiles them to a second and platform-neutral intermediate language, such as Common Intermediate Language (CIL). The intermediate language is provided to a runtime compiler 136, such as the Microsoft Common Language Runtime (CLR) in the .NET framework, that compiles the intermediate language into a machine readable code 138 that can be executed on the current platform or computing device.

The language-based model of this disclosure can be implemented as a method or as a computer program. In the case of a computer program, the language-based model is implemented as a series of computer-readable instructions included on a computer readable media, such a memory, a disc, a cloud, or the like. In one example, the language-based model is implemented in special-purpose agent-oriented language. A special-purpose language can be used alone or with a common language such as C#, to define concurrent application logic of relatively coarse granularity. In one example, the language is compatible with the .NET framework from Microsoft Corporation and participates in the common Object Oriented based execution principles of .NET. In another example, the language-based model can be implemented through extensions of an existing language, whether in native code or in managed code.

Figure 3:
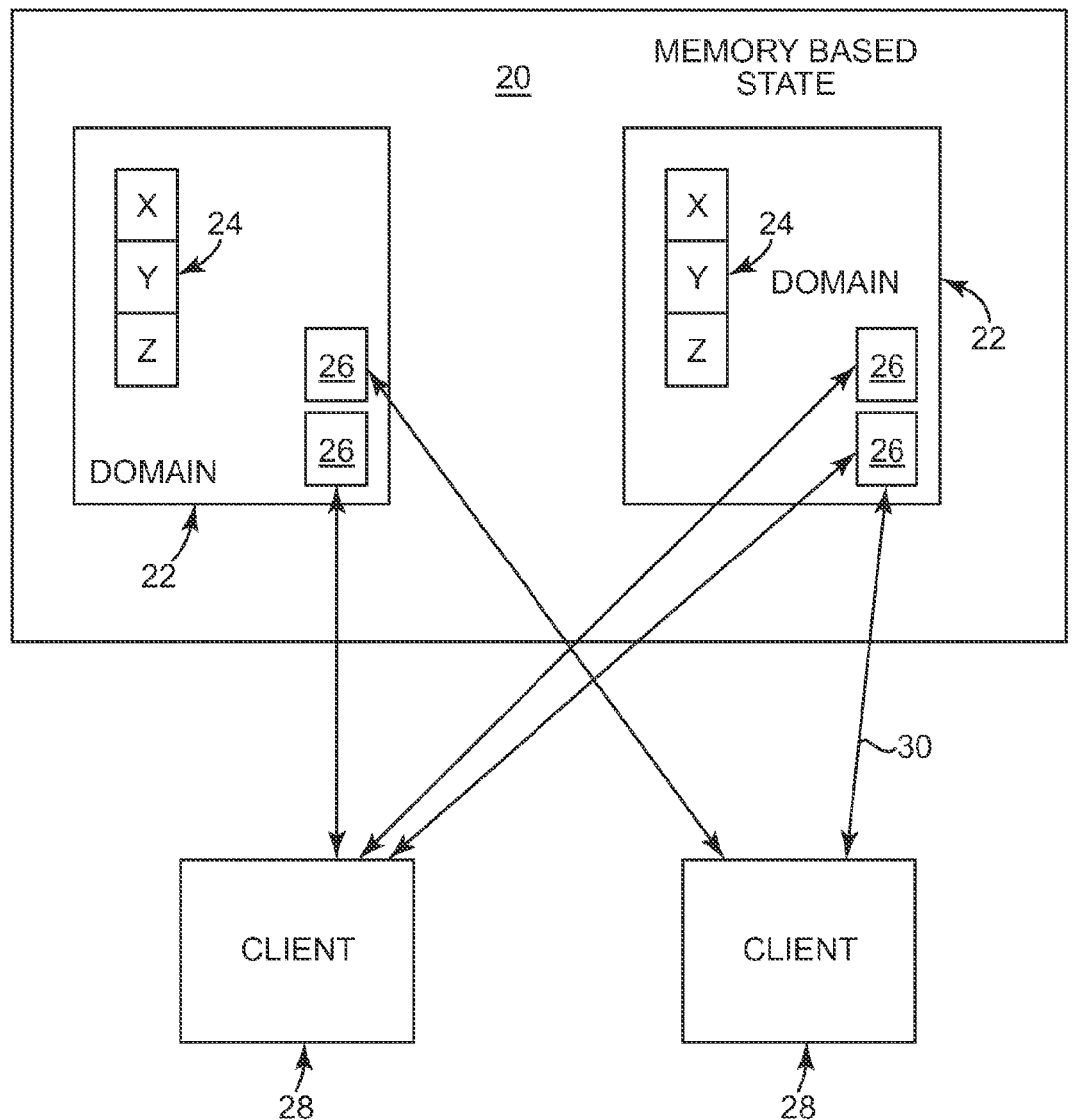
FIG. 3 is a block diagram illustrating an example language-based model operating either in the computing system of FIG. 1 or the managed environment of FIG. 2.

FIG. 3 illustrates an example language-based model for isolation shared state. The model is implemented in a programming language, and memory-based state 20 is partitioned into at least one but often a plurality of domains 22. Each domain includes a set of variables 24 within the boundaries of the domain 22, where the variables 24 inside of each domain 22 are isolated from the outside of the boundaries. At least one but often a plurality of agents 26 are introduced inside of the domains 22 and act on behalf of clients 28 outside of the domain 22. In one example, the client can be a thread of a concurrent application. The agents 26 communicate with their clients 28 via message-passing 30 to enforce the isolation of the domain state.

The agent 26 is a basic isolation concept of the language-based model. Each agent 26 is similar to a class, but a reference to an agent instance runtime construct is not held anywhere else. Rather, agents 26 interact with each other via message-passing over separately defined channels. The channels in turn define discrete ports through which data passes. In one example, channels define formal protocols for exchanges of data between communicating entities.

The domain 22 is similar to a class with only private fields and methods, and is isolated from other domains 22. Domains provide explicit isolation of memory between concurrent application components, such as threads. Only constructors are accessible outside of the domain 22. Agents 26 can be nested with a domain 22, in which case the agents may have access to the domain state, but the access of the agents 26 are automatically orchestrated to prevent race conditions.

One or more "data transfer" type definitions, called schema, are used to define the data passed between domains 22, agents 26, and clients 28. In one example, the schema is similar to an XML (extensible markup language) schema used to pass data between two web services, in that the schema defines the structure and rules for data passed between isolated components, such as agents 26. Messaging, or passing values between the agents 26 asynchronously or synchronously, is included in the interaction of agents 26. Message handling can be performed in a control flow structure including receive statements and interleaved control flow.

The domains 22, in one example, are declarative constructs and runtime constructs. A declarative construct can be considered to be a domain, and the runtime construct can be considered to be a domain instance. In this example, the public members of domains are the domain constructors. The domain constructors include the same type of constrained payload types as channel ports. Variables, methods, and functions declared within a domain are referenced (or called in the cases of methods and functions) from within the domain itself. The domain instances provide scoping and concurrency control for global data, such as data shared among agent instances.

In an example pseudo code, a domain can be represented as:

Example 1

```
public domain D1
{
    int x = 10;
    const int y = 10;
}
```

This construct defines a domain with two pieces of memory-based state with x and y being both integers. Additionally, y is declared as "const" in the domain, which means that y cannot be modified once it has been given a value.

While executing an application that has access to domain D1, the application can create domain instances of domain D1 through an allocation expression:

D1 *d*_1=new D1( );

The code creating the domain, however, is not considered to be inside the domain, and the code cannot access the variables in a domain instances because the variables are isolated.

In an object-oriented language, or a language that allows or encourages to some degree object oriented programming techniques, information is accessed with methods or properties that can either read the data or modify the data. This approach does not isolate the state from concurrent access of multiple components. In the language-based model of FIG. 3, accessing a domain instance state is forbidden from outside the domain, and the only access or control of a domain instance from outside its boundaries is to create the domain.

Instead of methods or properties used to access data, the language-based model includes the agents 26 inside the domain 22 to act on behalf of the clients 28. Agents do not use the same application component or the same thread of execution as the client 28. In order to access the variables 24, the agents 26 within a domain 22 coordinate agent access to the variables 24 among each other.

Similar to domains 22, agents are both declarative and runtime entities. Agent instances can be created from within the domain. The agents instances can also be created from outside of the domain in which the agents are declared using a method such as Create( ) or through another way made available from the runtime. Agents are further defined as either readers of the domain state, writers of the domain state, or having no access to mutable domain state.

An example is provided building upon Example 1 above:

Example 2

```
public domain D1
{
    int x = 10;
    const int y = 10;
    agent A1 { . . . }
    reader agent A2 { . . . }
    writer agent A3 { . . . }
}
```

In Example 2, agent A1 only has access to "y" because "y" cannot be modified. Agent A2 and agent A3 both have access to variable "x" and "y." Agent A2 can only read "x." Agent A3 can read from, write to, or otherwise modify "x." Thus, any number of instances of agent A1 can execute either concurrently with each other or concurrently with either instances of agent A2 or an instance of agent A3. Any number of instances of agent A2 can execute concurrently with each other but only if an instance of agent A3 is not executing. Because an instance of agent A3 can modify "x," the instance of agent A3 has exclusive access to the domain instance while executing code.

The agents A1, A2, and A3 communicate with clients 28 outside the domain via message passing to enforce the isolation of domain state. Referenced-based data, such as .NET objects, as well as value-based data are not permitted to escape a domain instance. Instead, the data can be copied or isolation can be achieved with other methods. In this example, the reader/writer declarative syntax is sufficient for the agents to safely access the domain state, other examples are contemplated where the agents cooperate with each other more explicitly via message-passing.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of isolating a shared memory-based state from concurrent clients of an application including an application component, the method comprising:
   partitioning a memory-based state into a plurality of domains, each domain including separate address spaces of a memory and including variables within boundaries of the domain, wherein the variables are isolated from outside of the boundaries of the domain, and wherein the variables within each domain are isolated from the other domains;
   introducing a plurality of agents inside the boundaries of the domains corresponding with a client of the application, wherein the agent acts on behalf of the client to access the variables within the domain, and the agent does not use the same application component or the same thread of execution as the client, wherein the agents include at least one read agent to read from variables within the domain, at least one write agent to read from or write to variables within the domain and at least one third agent to neither read from nor write to variables within the domain;
   executing any number of third agents concurrently with each other or with read agents or with one write agent;
   executing any number of read agents concurrently as long as no write agents are executing;
   executing only one write agent at a time such that the instance of the write agent as exclusive access to the domain while executing the write agent;
   wherein the domains and the agents are each both declarative and runtime constructs in a programming language based model; and
   enforcing isolation of the variables within the domain from the clients through communications between the agent and the corresponding client via message passing with a compiler and supporting runtime and through the agent interacting with other agents via message-passing over separately defined channels.

2. The method of claim 1 wherein method includes isolating the plurality of domains from each other.

3. The method of claim 1 wherein each agent can communicate with a plurality of clients.

4. The method of claim 1 wherein the current clients of an application include concurrent threads.

5. The method of claim 1 wherein each domain is both a declarative construct and a runtime construct interfacing with the compiler and the supporting runtime.

6. The method of claim 5 wherein the declarative construct is considered to be a domain, and the runtime construct is considered to be a domain instance.

7. The method of claim 6 wherein public members of the domain are domain constructors.

8. The method of claim 6 wherein the domain instances provide scoping and concurrency control.

9. The method of claim 6 and further including creating domain instances of a domain through an allocation expression.

10. The method of claim 1 including copying data from inside the domain to provide the message-passing between the agent and the client.

11. A system comprising:
memory to store instructions;
a processor to execute the instructions to:
partition a memory-based state into a plurality of domains, each domain including separate address spaces of a memory and including variables within boundaries of the domain, the variables are isolated from outside of the boundaries of the domain, and the variables within each domain are isolated from the other domains;
introduce a plurality of agents inside the boundaries of the domain corresponding with a client of an application including an application component, the agent acts on behalf of the client to access the variables within the domain via message-passing between the agent and the client and the agent does not use the same application component or the same thread of execution as the client, the agents include at least one read agent to read from variables within the domain, at least one write agent to read from or write to variables within the domain and at least one third agent to neither read from nor write to variables within the domain;
execute any number of third agents concurrently with each other or with read agents or with one write agent;
execute any number of read agents concurrently as long as no write agents are executing;
execute only one write agent at a time such that the instance of the write agent as exclusive access to the domain while executing the write agent;
the domains and the agents are each both declarative and runtime constructs in a programming language based model; and
enforce isolation of the domain with a compiler and supporting runtime through the agent interacting with other agents via message-passing over separately defined channels.

12. The system of claim 11 wherein the programming language is an object oriented based language that allows or encourages to some degree object oriented programming techniques.

13. The system of claim 12 wherein the programming language is in a managed language.

14. The system of claim 13 wherein the programming language is in a special purpose language used with the managed language.

15. The system of claim 11,
wherein each domain in a declarative construct is considered to be a domain, and each domain in a runtime construct is considered to be a domain instance; and
wherein each agent in a declarative construct is considered to be an agent, and each agent in a runtime construct is considered to be an agent instance.

16. A computer readable storage medium, which does not include transitory propagating signals, storing computer executable instructions for controlling a computing device to perform a method comprising:
partitioning a memory-based state into a plurality of domains, each domain including separate address spaces of a memory and including variables within boundaries of each domain, wherein the variables are isolated from outside of the boundaries of the domain, and wherein the variables within each domain are isolated from the other domains;
introducing a plurality of agents inside the boundaries of domains corresponding with a client of an application including an application component, wherein the agents act on behalf of the client to access the variables within the domain via message-passing between the agent and the corresponding client; and the agents do not use the same application component or the same thread of execution as the client, wherein the agents include at least one read agent to read from variables within the domain, at least one write agent to read from or write to variables within the domain and at least one third agent to neither read from nor write to variables within the domain;
executing any number of third agents concurrently with each other or with read agents or with one write agent;
executing any number of read agents concurrently as long as no write agents are executing;
executing only one write agent at a time such that the instance of the write agent as exclusive access to the domain while executing the write agent;
wherein the domains and the agents are each both declarative and runtime constructs in a programming language based model; and
enforcing isolation of the variables within each domain from the clients through communications between the agent and the corresponding client via message passing with a compiler and supporting runtime and through the agent interacting with other agents via message-passing over separately defined channels.

* * * * *